June 2, 1959   P. WOLF   2,888,887
METHOD OF MAKING CLOSED FILLED WAFER STRIPS
Filed July 5, 1955

INVENTOR
PAUL WOLF,
by John A. Brady
ATTORNEY

United States Patent Office 2,888,887
Patented June 2, 1959

2,888,887

METHOD OF MAKING CLOSED FILLED WAFER STRIPS

Paul Wolf, Eberstadt, near Darmstadt, Germany

Application July 5, 1955, Serial No. 520,076

Claims priority, application Germany July 13, 1954

3 Claims. (Cl. 107—54)

In the manufacture of the well known filled wafers of oblong shape comprising, where desired, a plurality of layers, it has for a long time been common practice to use suitable automatic wafer baking plant producing standard-size wafer sheets in a continuous succession, to spread a suitable filling material on one of the wafer sheets so produced, to place a second wafer sheet on top of the filling material, moving the sheet into contact with said material, and so on to produce the desired number of layers, and finally to use frames with cutting wires or disc or band type saws to cut the large-size wafer composed of several wafer sheets in a longitudinal as well as transverse direction so as to obtain wafers of smaller size.

In recent years, there have become known several suggestions intended to reduce the cost of wafer production by using a plurality of wafer baking machines of special design adapted simultaneously to produce a plurality of endless wafer strips between which a layer of filling material is introduced before said endless wafer strips are led together. These suggestions appear to be particularly promising, because it will be possible to provide for a relatively great width of the wafer strips if it is made possible, along the baking section of the plant, to maintain a uniform spacing between the boundary surfaces used to give the dough the desired shape. However, the possibility of carrying these suggestions into practice depends on the answer to the question whether the wafer strips thus produced are actually of a truly uniform thickness, whether said strips can be cooled down without more than a minimum number of cracks being formed in them, and whether it is possible, upon the occurrence of shrinkage cracks which cannot be completely avoided in practice, to prevent those portions of a wafer strip between which a crack has formed from being pushed one on top of the other. In order to meet these exacting requirements made of baking machines producing endless wafer strips, it is necessary to employ numerous structural elements resulting in a high price of a baking machine of this type.

According to the present invention, however, it is possible, with the aid of existing automatic baking machines delivering separate wafer sheets of a suitable standard size, to make the manufacture of filled wafers nearly as economical as it would become through the use of baking machines producing endless wafer strips.

The method of the invention comprises as a first step the placing on a suitable table or on a suitable conveyor of a single layer of wafer sheets of a suitable standard size baked in a wafer baking plant of known construction, the individual sheets being arranged to abut each other in any suitable manner in a longitudinal direction and, if desired, in a transverse direction. Thus there will be formed a layer of wafer sheets which is only interrupted by the butt joints between any two adjacent sheets; arranging said sheets in a uniform manner will result in a layer of constant width, the width of said layer corresponding either to the length of one of the sides of one of the wafer sheets, which in most cases are not square in shape, or to a multiple of the length of one of the sides. When thus arranging the individual wafer sheets in the form of a band which, in the case of a continuous production operation, will, of course, have to be of constant width, it will not be necessary to consider the direction in which the wafer sheets of non-square configuration are placed on their support (i.e., whether they are arranged longitudinally or transversely), if for example the length of the shorter side of the wafer sheets is two-thirds only of the length of the longer side. In this case, it is possible to arrange either two wafers end to end with their longitudinal axes extending transversely of the direction in which the conveyor means is advanced, the width of the array then corresponding to twice the length of a single wafer, or to arrange three wafers side by side with their longitudinal axes extending in the direction of conveyor movement, the width of the band thus formed being the same, i.e. three times the width of a single wafer sheet, this equaling twice the length of a single wafer sheet.

Then the continuous wafer sheet layer thus formed is covered with a layer of the filling material which is applied generally in the usual manner but with sufficient care so as not to disturb the arrangement of the wafer sheets on their support, and following this, as the third step of the method of the invention, there is placed on top of the filling layer a second layer of wafer sheets in the same manner as that described for the first layer. It is, however, important that the joints between adjacent sheets or panels in the upper wafer layer should be offset both longitudinally and transversely or at least either longitudinally or transversely in relation to the joints between the sections or panels in the lower wafer layer. The layer of filling material interposed between the two wafer layers thus serves to establish a firm bond between the said wafer layers, the resulting flat filled baked product offering sufficient resistance to any displacement of the wafer layers relative to one another when this composite product is passed through the necessary cutting devices. Nor is there any risk of the continuous succession of wafer sheets being torn off at the transverse joints when passing the cutting elements if the said joints are offset in the manner described. Under certain circumstances it may, of course, be necessary or desirable to equalize the thickness of the filled wafer strip by suitable pressing means in the form, for example, of rollers or belts, this equalizing action also tending uniformly to distribute the filling material between the wafer layers.

It is, of course, also possible by the method just described to produce composite wafers having several layers of filling material, this being done by applying on the second of the aforementioned wafer layers another layer of filling substance which is again covered with another wafer layer. These steps may be repeated several times.

An embodiment of the invention will now be described by way of example with reference to the accompanying drawing in which.

Figure 1:
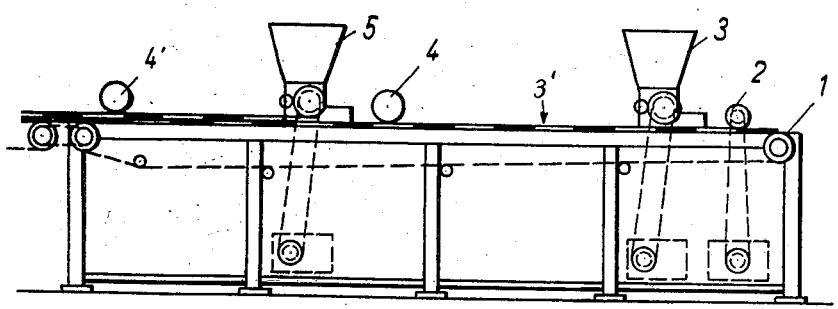
Fig. 1 is a schematic side elevation of a machine serving to arrange the wafers in the desired manner and to spread the filling material on them.

It will be seen in Fig. 1 that suitable apparatus for the production of a closed filled wafer strip comprises conveying means in the form of an endless conveyor belt 1. First there is deposited on this conveyor belt a continuous layer of wafer sheets which are arranged both side by side and end to end. A feed roll 2 ensures that the light-weight wafter sheets are actually moved along as the conveyor belt advances. The wafer sheets, which are thus held in close mutual abutment, are then covered with a layer 3' of filling material (see also Fig. 2), this layer being applied by a roller type spreading device 3. Immediately after the application of the layer 3' on the lower wafer layer, the layer 3' is covered with another layer of wafer sheets, care being taken, however, that the joints between the sections of the upper wafer layer are offset in relation to the joints between the section of the lower wafer layer. Then the filled water strip thus produced is passed under an equalizing roll 4 which compresses the entire strip to the desired final thickness while at the same time distributing the filling material over the entire wafer surface.

If it is intended to apply another layer of filling material on the uppermost wafer layer, another roll type spreading device 5 is provided for this purpose behind which the second layer of filling material may be covered with another layer of wafer sheets, care being again taken to offset the joints between adjacent sheets in this third layer in relation to the joints between the sheet of the next lower wafer layer. It will then be necessary to provide another equalizing roll 4' behind the second spreading device 5.

After the composite wafer strip has passed a cooling tunnel, the strip, which may, if desired, comprise a plurality of layers, may then be subdivided in any suitable known manner into individual wafers by severing the said strip in a transverse and/or longitudinal direction. Only a small portion of the longitudinal margins of the composite strip will be wasted, whereas the staggered or offset arrangement of the individual sheets in the different wafer layers imparts to the composite strip sufficient strength so that the strip may be fed past the cutting tools without the cohesion of the individual layers being destroyed even when one of the cutting elements occasionally makes its cuts in the immediate vicinity of, and parallel to, one of the joints. Since the filling substance completely fills the joints, the entire surface of the wafer strip will be uniform in appearance. When packaging the wafers, it will, of course, be preferred to take care that the externally visible covering sheets of the individual wafers do not show any joint.

Figure 2:
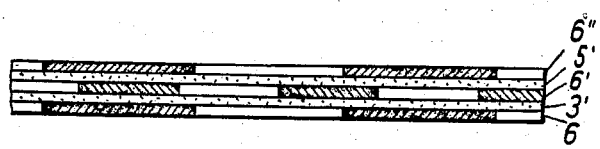
Fig. 2 is a cross section of a wafer strip which is composed of three wafer layers and two interposed filling layers.

Fig. 2 illustrates a cross section of a wafer strip composed of three wafer sheet layers with two interposed layers of filling material. The layers of filling material 3' and 5' are respectively applied by the roll type spreading devices 3 and 5. The thinner layers represent the wafer sheets 6, 6' and 6".

Figure 3:
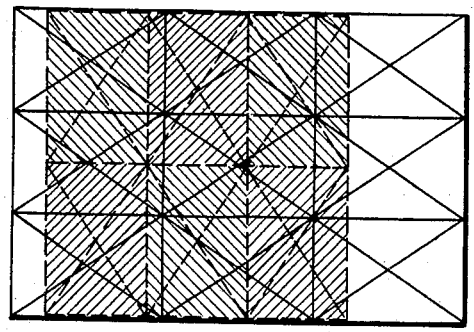
Fig. 3 is a plan view of two superimposed wafer layers in which the individual sheets or panels are arranged in such a manner that the joints of one layer are offset relative to the joints in the other layer.

Depending on the size of the individual wafer sheets, it is possible to offset the joints between adjacent sheets in relation to the joints in a different layer (see Fig. 3) in such a manner as to provide for a minimum of waste. In Fig. 3 it has been assumed that the shorter side of a wafer sheet is of a length amounting to two-thirds the length of the longer side. In this case it is possible, for example, to place on the conveyor belt 1 three wafer sheets side by side in a transverse direction so that the longitudinal axes of the sheets extend in the direction of conveyor movement. After the lower wafer layer has been spread with the filling material, the upper wafer layer is formed by placing two wafer sheets end to end in a transverse direction in such a manner that the upper layer is offset in relation to the transverse joint of the lower layer by one-third of the length of the shorter side of a wafer sheet. In this case the longitudinal offset by one-third of the length of the shorter side of a wafer sheet is maintained throughout the length of the filled wafer strip, while only the outer edges of the wafer layers coincide. In no case, however, will the inner transverse and longitudinal joints of two adjacent wafer layers coincide. This relative offsetting of the joints can of course also be obtained with wafer sheets having a different aspect ratio in order to produce the desired firm bond within the composite filled wafer strip. For the sake of simplicity Fig. 3 shows only a system of two wafer layers. Where the lower wafer sheets are covered by the upper ones, the lower ones are indicated by broken lines, the areas of some of the wafer sheets being more clearly indicated by their respective diagonals.

What I claim as new and desire to secure by Letters Patent of the United States is:

1. The method of making wafers which consists in aligning a plurality of baked pastry strips in a layer in end-to-end relationship to form joints therebetween, moving said strips in aligned position in a lineal direction, spreading a filling substance in a layer onto the aligned pastry strips while in motion and while maintaining the linearity thereof, applying another plurality of baked pastry strips end-to-end in a layer over the top of said spread filling substance with the joints therebetween offset from the joints between said first mentioned plurality of baked pastry strips, pressing said last mentioned baked pastry strips into contact with said filling substance while maintaining the linearity of movement thereof, whereby the tensile strength of at least two baked pastry strips in one of said layers is combined with the tensile strength of at least one of the baked pastry strips in another of said layers for imparting breakage resistance properties to the final wafer product.

2. The method of making wafers which consists in aligning a plurality of baked pastry strips in a layer edge-to-edge and end-to-end relationship in transverse and longitudinal alignment in the same plane to form joints therebetween, moving said strips in the aligned positions thereof longitudinally, spreading a filling substance in a layer onto the top surface of the aligned pastry strips while in motion and while maintaining the linearity of the movement thereof, applying another plurality of baked pastry strips in a layer in edge-to-edge and end-to-end relationship in transverse and longitudinal alignment to form joints therebetween in a plane superimposed upon said layer of filling substance and above said first mentioned layer of baked pastry strips and in positions with the perimetrical edges thereof offset from the perimetrical edges of said first mentioned baked pastry strips, pressing said last mentioned baked pastry strips into contact with said filling substance while maintaining the linearity of movement thereof, whereby at least two baked pastry strips in one of said layers have the linear edges thereof displaced out of stacked alignment with the perimetrical edges of the baked pastry strips in the other of said layers for increasing the resistance properties of the final wafer product to breakage.

3. The method of making wafers which consists in aligning a plurality of baked pastry substantially rectangular strips in a horizontal layer edge-to-edge and end-to-end relationship in transverse and longitudinal alignment in the same plane to form joints therebetween extending transversely and longitudinally thereof, moving said strips in the aligned positions thereof longitudinally, spreading a filling substance in a layer onto the top surface of the aligned pastry strips while in motion and while maintaining the linearity of movement thereof, applying another plurality of baked pastry substantially rectangular strips in transverse and longitudinally disposed layers edge-to-edge and end-to-end alignment in a plane superimposed upon said layer of filling substance and above said first mentioned layer of baked pastry substantially rectangular strips and in positions with the perimetrical edges thereof vertically offset from the perimetrical edges of said first mentioned baked substantially rectangular pastry strips, pressing said last mentioned baked pastry substantially rectangular strips into contact with said filling substance while maintaining the linearity of movement thereof, whereby at least two baked pastry rectangular strips in one of said layers have the linear edges thereof overlapping the baked pastry substantially rectangular strips in the other of said layers above the filling substance thereon, whereby the joint between the strips in one of said layers is displaced out of alignment with the perimetrical edges of the strips in the other of said layers.

References Cited in the file of this patent

UNITED STATES PATENTS

| | | |
|---|---|---|
| 1,210,496 | Lawrence | Jan. 2, 1917 |
| 1,942,423 | Henry | Jan. 9, 1934 |
| 1,946,495 | Jones | Feb. 13, 1934 |
| 1,975,326 | Loose et al. | Oct. 2, 1934 |

OTHER REFERENCES

"Everybody's Cook Book," 1924 by I. E. Lord, page 168. Published by Henry Holt & Co. (New York).